United States Patent Office 3,629,224
Patented Dec. 21, 1971

3,629,224
AQUEOUS PHASE POLYMERIZATION OF ETHYLENE
Enrico Cernia and Arturo Rio, Colleferro, Rome, and Natale Ercoli Malacari and Corrado Mancini, Milan, Italy, assignors to Societa Asfalti Bitumi Cementi e Derivati, S.p.A., Rome, Italy
No Drawing. Continuation-in-part of application Ser. No. 436,645, Mar. 2, 1965. This application June 3, 1969, Ser. No. 830,111
Claims priority, application Italy, Mar. 10, 1964, 5,195/64
Int. Cl. C08f 1/60, 3/06
U.S. Cl. 260—94.9 A                                    7 Claims

ABSTRACT OF THE DISCLOSURE

Ethylene is polymerized by contacting and agitating gaseous ethylene with an aqueous solution containing a low concentration of a free radical initiator and a nonionic surfactant in a concentration below its critical micelle concentration, at a temperature below 100° C. and under a pressure of about 10 to 100 atmospheres for a period of time of about ½ to about 8 hours. The molecular weight of the product increases with increasing periods of polymerization. Polyethylene having a high degree of linearity, high purity and a narrow distribution of molecular weight over the range of about 50,000 to 350,000 is obtained by the process.

---

This is a continuation-in-part of our copending U.S. patent application Ser, No. 436,645 filed Mar. 2, 1965.

BACKGROUND OF THE INVENTION

This invention relates to a new process for the polymerization of ethylene by means of a free radical initiator which leads to polymers of high molecular weight and high crystallinity. In particular, the present invention concerns the polymerization of ethylene in the presence of an aqueous medium.

The polymerization of ethylene in the form of an aqueous emulsion to produce normally solid polyethylene was first proposed by Hopff et al. in 1956. However, it proved to be extremely difficult to obtain emulsions having the necessary ethylene concentration. Furthermore, emulsions of ethylene in aqueous media are inherently unstable and require particularly vigorous agitation for their preservation even under high ethylene pressure.

The polymerization of ethylene in solution in various solvents has also been proposed, for example in U.S. Pat. No. 2,334,195. In such processes, as in the polymerization of ethylene in an emulsion, it is difficult to obtain solutions of ethylene at high, stable ethylene concentrations. This is exceedingly disadvantageous; the limiting factor with respect to the rate of ethylene polymerization in solution is the relatively low speed of the dissolution of ethylene in the solvent. However, even if the problems of solubility and diffusion did not exist, the chain transfer mechanism of polymerization in solution would be detrimental to the quality of the resultant polymer.

For these reasons, processes for the polymerization have been proposed, as in U.S. Pat. No. 2,475,628, in which ethylene is polymerized in the gaseous state in the presence of a homogeneous gas phase catalyst to produce normally solid polyethylene. Such a polymerization is carried out with good yield at a temperature lower than the softening temperature of the resultant polymer. However, although the polymerization of ethylene in the gaseous phase has many advantages over polymerization in solution or emulsion, there is one problem, which, if not overcome prevents the practical application of this process. The polymerization of ethylene in the gaseous phase produces a polymer which stratifies on the walls of the reactor. Thus, the actual volume of the polymerization reactor is progressively reduced in a relatively short time to such an extent, that it is necessary to interrupt the process of polymerization in order to remove the polymer present in the reactor. Furthermore, under these conditions, it is impossible to control the reaction, nonhomogeneous products may thereby be obtained, and in addition there is a serious danger of explosion.

To overcome these difficulties, it has been proposed to line the walls of the reactor with a continuous film of water containing a surfactant. It was observed that although the water did not impede the accumulation of the polymer on the walls of the reactor, the addition of surfactants prevented the polymer from adhering to the walls, probably due to an action of preferential absorption on the part of the surfactant on the walls themselves. In this process, the polymer is not mechanically swept from the walls of the reactor, but it is not permitted to come into contact with them. For this purpose, a thin film of water, relatively slow moving and containing a surfactant is sufficient.

More recently, an improvement in the process of ethylene polymerization has been proposed in U.S. Pat. No. 2,728,755 using as catalysts, the peroxide carbonate esters, which have also been described in U.S. Pat. Nos. 2,475,-628; 2,475,643; and 2,475,648 for the polymerization of ethylene, and a liquid, separate carrier phase to remove the polymer product from the reaction area. The liquid carrier phase in this process neither acts as a solvent nor forms an emulsion in the reaction area and it is therefore readily separable together with the product from the unreacted ethylene and catalyst. The product-carrying liquid used in great quantities, contains in solution a surfactant and prevents the polymer product from being deposited on the walls of the reactor. In this process, the polymerization takes place in the dense gaseous ethylene phase and the polyethylene formed is then transferred as a dispersion into the separate carrying phase whereupon it is removed from the reactor.

SUMMARY OF THE INVENTION

A principal object of the invention is the provision of an improved process for polymerizing ethylene in the presence of an aqueous medium and at a temperature below the softening temperature of the resultant polymer whereby polyethylene of uniform and improved quality is obtained.

Another object of this invention is the provision of a process of polymerizing ethylene in which the polymerization takes place in the aqueous medium, whereby the exact conditions desired of temperature and pressure may be maintained and whereby the development of the polymerization may be controlled by varying the parameters of the reaction.

A still further object of this invention is the provision of a proces for the polymerization of ethylene in which the reaction mixture continues to polymerize even after the complete disappearance of the catalyst and wherein both the conversion rate and the molecular weight and structure of the resultant polymer may be regulated by the period of time during which the polymerization is carried out.

These objects and others are accomplished by the present invention which will be described below.

It has been found that polyethylene of high purity, having a narrow distribution of molecular weight in the range of about 50,000 to 350,000 is produced by polymerizing ethylene in the presence of an aqueous solution containing a low concentration of a free radical initiator and a surfactant in a concentration belows its critical micelle concentration.

According to the present process, ethylene is agitated with an aqueous solution containing a free radical initiator in an amount of about 0.001 to 0.5 percent by weight based on the weight of ethylene and a surfactant in a concentration below its critical micelle concentration at a pressure of about 100 to 1,000 atmospheres and a temperature not above 100° C. The molecular weight and structure of the polyethylene product, as well as the rate of conversion of ethylene to polyethylene are dependent upon the period of time that the polymerization is permitted to proceed; therefore, the reaction is discontinued when a product having the desired molecular weight is obtained.

In addition to having uniform high molecular weights, polyethylene produced according to the present process has a very high chain linearity, the methyl content being less than 7 per 1,000 carbon atoms and an elongation percentage at break of over 500 percent.

DESCRIPTION OF THE PREFERRED EMBODIMENTS

According to the present process, a surfactant must be present in the aqueous solution in which ethylene is polysurfactant in a concentration below its critical micelle concentration. The critical micelle conentration, as discussed in "Frontiers in Colloid Chemistry," by R. E. Burk and Oliver Gummit, published by Interscience Publishing Company, 1959, refers to the lowest concentration of a surface active agent at which an emulsion is formed or the colloid micelles begin to grow. Below the critical micelle concentration no emulsion is formed.

Depending on the particular surfactant used, and also the properties desired in the final polymer, in the present process a surfactant is generally present in the aqueous medium in a concentration of about 0.001 to 0.5% by weight. The concentration of surfactant used according to the present process is more often in the range of 0.01% to 0.2% and most preferably 0.05% to 0.3% based on the weight of water.

As will be discussed below, polymerization according to the present process takes place initially solely in aqueous solution, forming colloidal aggregates of low molecular weight polymer. Desirably, the surfactant should be capable of increasing the rate of dissolution of ethylene in water. Also the surfactant should provide suitable conditions for the formation and stabilization of the colloid. For the purpose of the present process, the surfactant should have a lyophilic-lyophobic balance, i.e. [Σ (total number of the lyophilic group)-Σ (total number of the lyophobic groups)+7], such that the lyophobic groups allow the transfer of the polymerization locus from the aqueous to the colloidal phase, and the lyophilic parts cause initially the stabilization of the colloidal aggregates and subsequently of the poly/monomer particles.

Nonionic surfactants are used in the present process; those having the desired characteristics include, for example, Lubrol W, Aionico LNS and Antarox Co 630, alkyl aryl polyethyleneglycol, alkyl polyethyleneglycol and products of esterification of saturated and unsaturated fatty acids of long and short chains, with the sorbitan where the hydroxylic functions of sorbitan have been condensed with varying amounts of ethylene oxide. The following surfactants are also used in the present process: products of condensation of fatty amines with ethylene oxide (Araphen K 100, Araphen T 100, Noramox S 3, Noramox S 7, etc.) that is, nonionic products of weak cation active character which can form of salts with long chain organic acids and are therefore modifiable in their lyophilic character. Especially preferred surfactants include the condensation product of the nonylphenol with 15 moles of ethylene oxide, the condensation product of the higher alcohols, such as lauryl and cetyl alcohol with 20 moles of ethylene oxide, the polyoxyethylene sorbitan monostearate which contains 20 moles of ethylene oxide, a mixture 60–40 by weight of sorbitan monolaurate and polyoxyethylene sorbitan monolaurate, and the condensation product of 7 moles of ethylene oxide with a primary amine containing 16 carbon atoms. These materials may be used alone or as mixtures.

A higher alcohol, that is an alcohol containing about 14 to 20 carbon atoms, such as cetyl alcohol may be employed together with the surfactant in the present process in a concentration of about 0.001 to 0.2% by weight, based on the weight of water.

According to the present invention, the initiator is a radical type initiator and must have a brief transformation time and a low decomposition energy in order to be active at the temperature at which the reaction is conducted. Among the various initiators having the necessary characteristics, alkyl peroxycarbonates and some azo compounds which have proved to be particularly suitable for this type of process are used.

In a preferred embodiment of this process, a mixture of dialkyl peroxycarbonate and an α-substituted acylperoxide is used as the initiator. Among the dialkyl peroxidicarbonates used in the present process may be mentioned diethyl peroxidicarbonate, diisopropyl peroxidicarbonate, di(tertiarylbutyl) peroxidicarbonate and diisoamyl peroxidicarbonate. Examples of suitable α-substituted acylperoxides includes α-chloro-dibenzoylperoxide and α,α'-dichlorodibenzoylperoxide.

The initiator is present in the aqueous medium in a concentration of about 0.00005% to 0.4%, preferably 0.007% to 0.03%. The amount of initiator present relative to the concentration of ethylene in the aqueous phase which is about 0.001% to 5% strongly influences the course of the reaction. According to the present invention, the initiator is present solely in the aqueous phase. Under ordinary conditions the initiator may be only partially soluble in water at the desired concentration, however the presence of the surfactant causes the initiator to be completely dissolved in the aqueous medium.

The present process can be carried out at a temperature from about 10 to 100° C., dependent on the type of polymer desired and also dependent on the stability of the surfactant. Each surfactant has a decomposition temperature above which it loses its activity. At low temperatures, the polymerization reaction is extremely slow. The optimum temperature for carrying out the polymerization of ethylene according to the present process is between 60 and 75° C.

The optimum pressure of the present reaction is about 500 to 600 atmosphere; however, the reaction can be conducted at a pressure of about 100 to 1,000 atmospheres. Most preferably, the pressure is maintained at a constant value during the polymerization, generally, additional ethylene is fed into the reaction as necessary for this purpose.

In view of the fact that the amount of ethylene converted and the molecular weight of the polyethylene product varies depending with the period of polymerization when polymerization is carried out according to the present process, it is believed that the present process is characterized by three reaction stages. However, it is understood that the invention is not limited by any theoretical considerations.

In the first stage of polymerization, the initiator which is dissolved in the aqueous medium decomposes with the formation of free radicals, thus initiating the polymerization of the ethylene dissolved in the water. There is no initiator present in the gaseous phase, and hence polymerization takes place only with respect to the ethylene dissolved in the aqueous medium. The concentration of ethylene in the aqueous solution is, of course, dependent upon the temperature and pressure under which the polymerization is carried out. However, the approximate range of the solubility of ethylene is of the order of 0.6 and 0.7 gram of ethylene per 100 grams of water. A more complete discussion of the solubility of ethylene in water may be found in an article by E. J. Bradbury et al., Industrial and Engineering Chemistry, vol. 44, No. 1, page 211. Due to the high proportion of free radical concentration to ethylene monomer concentration in the first stage of the reaction, a large number of polymer molecules of limited size, i.e. low molecular weight and of a particular structure are obtained.

The prepolymer contains a balance between lyophobic and lyophilic groups so as to form a new surfactant in situ; the lyophilic groups arise from the decomposition of the catalyst and/or chain transfer with the surfactant, and the lyophobic group is constituted by the short polyethylene chain. The concentration and structure of the prepolymer is dependent upon the parameters of the reaction, i.e particular initiator chosen, concentration of initiator, temperature and pressure.

The second stage of the polymerization may be considered to be in the colloidal phase, since the prepolymer or new surfactant produced in situ together with the original surfactants can form the so called "composite micelles," i.e. colloidal aggregates stabilized by surfactant. In this stage, wherein there are numerous low molecular weight polymeric molecules of such structure that they are easily situated among, and probably surrounded by surfactant molecules, the solubility of the ethylene monomer is increased. Consequently, there is an auto acceleration of the rate of polymerization, which in turn results in the growth of the polymer molecules. In this way, the colloidal aggregates are transformed into solid stabilized particles which form the new and principal locus of polymerization in the third stage of the reaction. Thus, macroradicals mainly constituted by the colloidal aggregates originate during the second stage of polymerization.

In the third and final polymerization stage, a heterophase reaction occurs between the polymer particles and monomer diffused therein. Thus, the polymer molecules continue to grow depending on the amount of diffused monomer in the macromolecules.

Vigorous agitation should be used, in order that the monomer be in close contact with the locus of polymerization. Such agitation can be effected in various ways, for example beating, bubbling, turbulence, rotation et cetera. It has been found that circular agitation, in which the reaction mixture is drawn from the bottom of the reactor and then dropped down again from above in a finely divided spray by mechanical means, or the action of a compressed gas such as, in particular, ethylene itself is an especially desirable procedure for obtaining the necessary contact between ethylene and the polymer particles. Suitable gas diffusors may also be used to attain the desired close contact between the gaseous and aqueous phases.

One of the important characteristics of the present process is the "living mechanism" of the third stage of the polymerization reaction, wherein the presence of long lived radicals, referred to herein as "macroradicals" provide polymers of particularly high molecular weight. Further, as a result of the presence of the macroradicals which are present in the preparation of polyethylene in accordance with the present invention, the molecular weight of the product increases with increasing periods of polymerization.

In accordance with the present process, after an interval of time, as the polymerization proceeds, there is a continuous, substantial decrease in the ratio between the concentration of the initiator and the concentration of monomer. In the third stage of polymerization, the production of free radicals decreases, since most of the initiator has already been expended. Termination by the usual mechanisms, namely coupling and disproportionation diminishes notably with the disappearance of initiator, and ceases entirely when the decomposition of the initiator is complete. The macromolecules tend to be buried in the solid phase, and direct termination of polymerization between macromolecules which might occur as a result of the collision thereof on the surface is extremely improbable. The high viscosity of the medium also makes termination reactions between buried macroradicals exceedingly improbable.

The low degree of chain transfer in the present medium is also an important factor in obtaining a polymer product of high molecular weight. Thus, in the third stage of the reaction, the only mechanism of termination of polymerization is that of polymer-polymer and polymer monomer chain transfer. However, in the present process, the mechanism of chain transfer is low and there is an enormous difference in the overall rate of initiation and the rate of termination.

Thus, in the present process, the macroradicals are permitted to "mature" or "live" during a relatively long reaction time; therefore the present process cannot be carried out in the stationary state of a continuous process.

Another advantageous characteristic of the present process, is that the highly viscous medium of the third stage of the polymerization leads to the continuous immobilization of radical "tails," which results in a polymeric chain having a high degree of linearity.

Water is used as the dispersing medium because chain transfer mechanisms are absent or negligible therein. Water is also a desirable medium for the present reaction due to its high thermal capacity and its low cost.

The high thermal capacity of water serves as an internal heat stabilizer for the present reaction and provides for the dissipation of any elevation in the heat of reaction and therefore lends itself to the exact control of the reaction temperature. In practice, generally about 4 to 8% by weight of ethylene based on the volume of water is used in the present process.

The present process may be carried out in a plant in the following manner.

Ethylene, in a concentration higher than 99.9% and containing less than 20 p.p.m. of oxygen is compressed by the pressure of exercise and is then fed in parallel to a series of reactors which operate out of phase in time. After polymerization has been carried out for the desired time, the reaction mixture is unloaded cyclically at ambient atmospheric or slightly higher pressure (connected to an ethylene gasometer); this mixture contains a certain amount of water which is maintained between 80 and 120° C. The combined action of "flashing" which occurs at the time of unloading and of steam distillation almost entirely eliminates the ethylene contained in the polymer.

The water in which the polymer is maintained as a dispersion by means of the action of the surfactant and/or agitation is ultimately expelled from the polymer by filtration which can be effected in the usual means such as a centrifuge.

The water of the first filtration which contains a high concentration of surfactant is stored and used for further reactions. The polymer is then subjected to a series of washings with pure water in order to eliminate as far as possible any impurities Subsequently, the damp slurry coming from the filtration and containing between 10 and 30 percent of water is partially dried to about 2 percent of humidity, preferably using a pneumatic drying system with hot gas such as nitrogen in a closed cycle. The polymer dust is then finally dried, most preferbaly by being placed into a rotating cylinder with hot gas such as nitrogen so that the humidity is decreased to about 0.2%. The polymer dust which has been dried in this way is sent to a storage bin after passing through a series of vibrating sieves where it undergoes the final finishing phase, namely granulation and sacking.

In comparison with traditional high pressure processes, the present process which is considered to be a medium pressure process is substantially advantageous in having a lower operative and investment cost, due to the use of simpler apparati and to the reduction in the costs of compression. In comparison with the low pressure process, the present process is advantageous in the elimination of solvent leaks and in the absence of metallic impurities in the finished polymer.

Also, the use of water as the reaction medium is exceeding advantageous in that reaction heat is eliminated without the undesirable use of an organic solvent as a heat stabilizer commonly used in the low pressure processes.

Further, the polymer product obtained according to the present process has the desirable characteristics of linearity found in the products obtained by the low pressure process together with the purity and homogeneity of the high pressure process. Another advantageous feature of the present process is the ease of obtaining polyethylene in a wide range of molecular weights by simple regulation of reaction parameters, especially the period of polymerization.

The following examples further illustrate the best mode contemplated for carrying out the present process; however these examples must not be considered as limiting the concept or scope of the present invention in any manner whatsoever.

EXAMPLE 1

Water, surfactant (0.050% based on the weight of water) and isopropylperoxicarbonate (0.014%) are introduced at room temperature into a stainless steel autoclave, provided with a heating jacket and a rotating agitator capable of producing a high number of revolutions per second, and supplied with a suitable device which permits a high rate of exchange between the liquid and gaseous phases. After having made an inert gas bubble, the autoclave is closed and then fed with ethylene in an amount of 5% by weight based on the weight of water. In a period of 10—15 minutes, the system is brought to 65° C. and reaches the fixed pressure of 500 kg./cm.$^2$. A pressure fall, which begins after a brief period of induction, is compensated by continuous and regular reloading which thereby permits operation at a constant pressure.

After a reaction time of 1 hour, the autoclave is degassed. The product appears as a fine suspension of polyethylene in water which is easily separated by filtration. The polymer dust obtained in this way is once more dispersed in water, filtered and dried. A conversion of 22% (considering the ethylene consumed for the recharging) is obtained.

The characteristics of the polyethylene obtained are as follows:

| | |
|---|---|
| Molecular weight | 55,000 |
| Density (gr./cc.) | 0.9518 |
| CH$_3$/1000 C | 6.46 |
| Color | Very white |
| Ashes | Absent |

EXAMPLE 2

Polymerization is carried out in exactly the same manner as described in Example 1, except that the reaction time is prolonged to 2 hours. In this case the following results are obtained:

| | |
|---|---|
| Conversion | 30% |
| Molecular weight | 95,000 |
| CH$_3$/1000 C | 5.71 |

EXAMPLE 3

Polymerization is carried out under the same conditions as Example 1, except that the reaction time is increased to 4 hours. The following results are obtained:

| | |
|---|---|
| Conversion | 38% |
| Molecular weight | 140,000 |
| RCH=CH$_2$/1000 C | 0.310 |

EXAMPLE 4

Polymerization is carried out under the same conditions as Example 1, except that the reaction time is prolonged to 8 hours. The following results are obtained:

| | |
|---|---|
| Conversion (percent) | 45 |
| Molecular weight | 182,000 |
| RR'C=CH$_2$/1000 C | 0.041 |

EXAMPLE 5

The autoclave described in Example 1 is loaded with 1800 p.w. of water without oxygen, 0.4 part of diethyl- peroxicarbonate and 5.6 parts of a nonionic surfactant (a product of the condensation of a long chain fatty alcohol and oxide of ethylene). The autoclave is closed under an ethylene load and then charged with ethylene containing less than 20 p.p.m. of oxygen. The total quantity of ethylene being 80 g. so that the proportion of ethylene is 4.4% based on the volume of water. The reaction mixture is heated to 65° C. and kept for 2 hours at 500 kg./cm.$^2$. The reactor is then cooled, freed from excess gas, and opened. The polyethylene dust obtained is washed with water and dried in a vacuum stove. Twenty four parts of polymer are obtained, characterized by a molecular weight of 55,000 and a density of 0.09410.

The repetition of the above example, using only 1.4 parts of the same surfactant, gives 48 parts of polyethylene having a molecular weight of 118,000 and a tensile strength of 200/cm.$^2$.

EXAMPLE 6

A cylindrical stainless steel autoclave, furnished with a mixer, is filled to 4/5 with an aqueous solution to 0.1% of a nonionic surfactant. Then the diisopropylperoxicarbonate is added, in a concentration of 0.007% with respect to the solution. After the removal of the air, the ethylene is compressed up to a pressure of 280 kg./cm.$^2$. The autoclave is then heated to a pressure of 500 kg./cm.$^2$. This pressure is maintained for 3 hours with a maximum variation of ± 5 kg./cm.$^2$. Finally, after degassing, polyethylene dust is obtained which is filtered and dried without undergoing further treatment. Thirty seven grams of polymer are obtained with a molecular weight of 110,000 and a Vicat softening point of 117° C.

Polymerization is carried out in the same manner, changing only the concentration of the initiator (0.028% of water) after 3 hours, 64 grams of polymer with a molecular weight of 52,000 are obtained.

EXAMPLE 7

Two l. of solution formed by 0.20% of a nonionic surfactant and 0.014% of t.butylperoxicarbonate is poured into an autoclave provided with a suitable stirring system. After extracting the air, 123 grams of ethylene which reach a pressure of 400 kg./cm.$^2$ at 65° C., are compressed in the autoclave. Keeping this pressure constant by continuous recharges, for a period of 2 hours, after degassing, filtration and drying, 25 grams of polyethylene dust with a molecular weight of 50,000 and a density of 0.9455 are obtained.

This polymerization is repeated in the same manner except that 135 grams of ethylene are introduced at a temperature of 65° C. and a pressure of 600 kg./cm.$^2$, 55 grams of polymer with a molecular weight of 139,000 and a density of 0.9432 are obtained.

EXAMPLE 8

One hundred twenty nine grams of gaseous ethylene are added to 2 l. of the same solution as that in Example 7. The system is heated to 65° C. and reaches a pressure of 500 kg./cm.$^2$. The reaction, under continuous agitation, is left to proceed under falling pressure. After 8 hours the pressure is 252 kg./cm.$^2$. After the normal filtration and drying treatments, 57 grams of polymer dust with an intrinsic viscosity in Decalin at 130° C. of 1,600 dl./gr. are obtained.

EXAMPLE 9

In a tubular, verticle, stainless steel reactor, furnished with a device which permits the continuous circulation of the reagents and products of polymerization from the bottom to the top of the reactor itself, 1500 parts in weight of water are introduced under weak ethylene pressure. By means of a heating jacket, this is brought to a temperature of 80° C. (reactor temperature). At this point, a feeding pump introduces 3 parts of a nonionic surfactant and 0.42 of an alkylic peroxicarbonate emulsified in a little water. Lastly, more ethylene is introduced until the desired pressure of 500 kg./cm.$^2$ is reached. A recycle of 1000 parts of reagent per minute is passed through the gaseous phase in a continuous manner, in this way assuring the gas-liquid diffusion and the agitation of the system. After a reaction time of 120 minutes, at a constant pressure through continuous reloading, 124 parts of polymer dust characterized by a molecular weight of 135,000 and a density of 0.9420 were obtained.

A similar reaction, held for the same length of time at 60° C., produced 80 grams of polymer in a very fine powder form with a molecular weight of 175,000 and a slightly higher density.

EXAMPLE 10

A vertical tubular reactor is filled 2/5 with a solution of 0.1% of a surfactant. In the reactor it is possible to withdraw continually from the head, part of the gaseous phase only, which is then replaced by means of a centrifugal compressor, at the bottom of the reactor, in this way the double effect of diffusion of the gaseous phase and the agitation of the medium is obtained. The initiator, isopropylperoxicarbonate, is added in a quantity of 0.028% to the water. When the temperature of the solution has reached 70° C. the ethylene is compressed to a pressure of 300 kg./cm.$^2$ and the centrifugal compressor is set in motion. After a period of 100 minutes the gaseous phase is eliminated, obtaining a suspension of polymer in water which is filtered, treated with steam to eliminate the excess of surfactant, separated by centrifugation and finally dried with nitrogen at a high temperature. Fifty three grams of polymer were obtained with a melt index of 1.84 gr./10′.

EXAMPLE 11

Polymerization is carried out as described in Example 1 except that the reaction temperature was 60° C. and as the initiator equal quantities of isopropylperoxicarbonate and α-chloro-dibenzoylperoxide are used in a total concentration of 0.020. The reaction is allowed to proceed for 2 hours. The results of the polymerization are:

| | |
|---|---|
| Conversion (percent) | 34 |
| Molecular weight | 76,000 |
| Density (gr./cc) | 0.9531 |
| $CH_3/1000\ C$ | 5.00 |

What we claim and desire to secure by Letters Patent is:

1. A process for the polymerization of ethylene to produce polyethylene of high purity and linearity and having a narrow distribution of molecular weight of about 50,000 to 139,000 which comprises introducing ethylene to an aqueous solution containing a water soluble free radical initiator in an amount of about 0.007% to about 0.03% by weight based on the weight of water and a nonionic surfactant in a concentration of about 0.05 to 0.3% based on the weight of water which is below its critical micelle concentration, the ethylene being introduced in an amount of 5% by weight based on the weight of the water, agitating the ethylene together with said aqueous solution, at a temperature of about 60–75° C. and a pressure of 100 to 1,000 atmospheres, said initiator being present only in the aqueous phase and thereby initially polymerization takes place only with respect to ethylene dissolved in the aqueous solution and varying the period of time for polymerization from about ½ hour to about 8 hours to obtain a product of the desired molecular weight, the molecular weight increasing with an increasing period of polymerization.

2. Process according to claim 1 in which said free radical initiator is a dialkyl peroxycarbonate.

3. Process according to claim 1 in which ethylene is added during the polymerization to maintain the pressure at a constant value.

4. Process according to claim 1 in which the pressure during the reaction is maintained at 500–60 atmospheres.

5. Process according to claim 1 in which the reaction mixture is agitated by the continuous circulation of the aqueous mixture as a dispersion through the gas phase.

6. Process according to laim 1 in which the part of the gaseous ethylene phase is continually withdrawn from one zone of the reaction and replaced in another zone of the reactor in contact with the aqueous phase thus effecting the diffusion of the gaseous ethylene in the aqueous phase and the agitation of the mixture.

7. In a process for the polymerization of ethylene at an elevated temperature and a pressure of about 500 to 600 atmospheres in the presence of an aqueous solution containing a nonionic surfactant and a water soluble free radical initiator to produce polyethylene having a molecular weight of about 50,000 to 139,000, the improvement which comprises introducing ethylene to said aqueous solution in an amount of 5% by weight based on the weight of water, said aqueous solution containing about 0.007% to 0.03% by weight of initiator and 0.05 to 0.3% of surfactant, the initial polymerization of ethylene taking place only with respect to ethylene dissolved in said solution and then varying the total period of time for the polymerization from about ½ hour to about 8 hours to obtain a product of the desired molecular weight, the molecular weight increasing with increasing periods of time.

References Cited

UNITED STATES PATENTS

| | | | |
|---|---|---|---|
| 2,685,577 | 8/1954 | Cerveng et al. | 260—94.9 |
| 2,728,755 | 12/1955 | Weisemann | 260—94.9 |
| 2,788,340 | 4/1957 | Dannels | 260—94.9 |
| 3,089,865 | 5/1963 | Walther et al. | 260—87.1 |
| 3,119,802 | 1/1964 | Guillet et al. | 260—94.9 |
| 3,496,157 | 2/1970 | Cernia et al. | 260—94.9 |

FOREIGN PATENTS

| | | |
|---|---|---|
| 1,429,582 | 1/1966 | France. |

JOSEPH L. SCHOFER, Primary Examiner

E. J. SMITH, Assistant Examiner